United States Patent [19]
Pfeifer

[11] 3,858,898
[45] Jan. 7, 1975

[54] STEERABLE TOBOGGAN

[76] Inventor: Hallie C. Pfeifer, 1790 Grassland, Reno, Nev. 89502

[22] Filed: June 22, 1973

[21] Appl. No.: 372,544

[52] U.S. Cl. .............................................. 280/22
[51] Int. Cl. .................... B62b 13/08, B62b 17/00
[58] Field of Search............ 280/22, 21 R, 12 R, 28, 280/12 AA, 16, 12 B

[56] References Cited
UNITED STATES PATENTS

| | | | |
|---|---|---|---|
| 944,773 | 12/1909 | Clay | 280/22 |
| 2,027,128 | 1/1936 | Tessmer | 280/22 |
| 2,150,558 | 3/1939 | Maneval | 280/22 |
| 2,677,551 | 5/1954 | Berg | 280/21 R |
| 2,766,992 | 10/1956 | Rohe | 280/22 |
| 3,498,627 | 3/1970 | Pfeifer | 280/22 |

Primary Examiner—George E. A. Halvosa
Assistant Examiner—Gregory W. O'Connor
Attorney, Agent, or Firm—Townsend and Townsend

[57] ABSTRACT

A steerable toboggan is disclosed. The toboggan comprises a generally flat-bottomed shell which is adapted to slide over a surface such as snow, water and the like. Parallel elongate guide vanes are provided on the underside of the shell, and are adapted to penetrate the surface. Each vane is pivotally attached to the shell adjacent both ends of the vane. A pair of ropes controlling a sliding bar attached to the vanes are provided for transversely deflecting the elongate vanes at the centers thereof to bend the guide vanes into an arc shape, causing the shell to turn as it slides over the surface.

11 Claims, 8 Drawing Figures

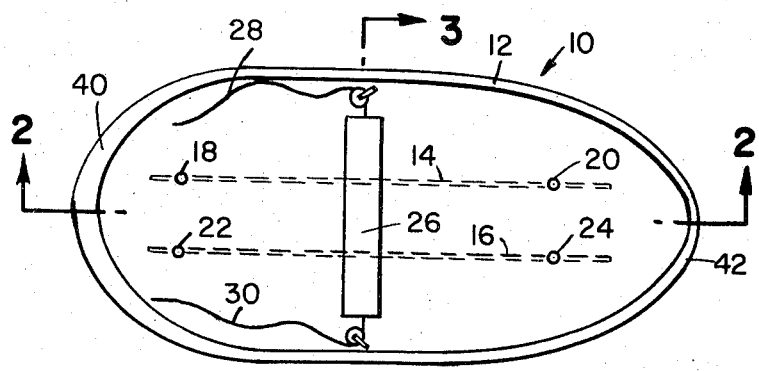
FIG_1
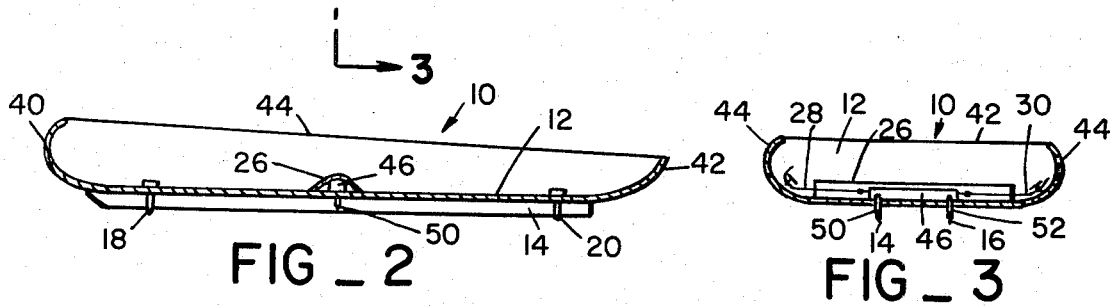
FIG_2
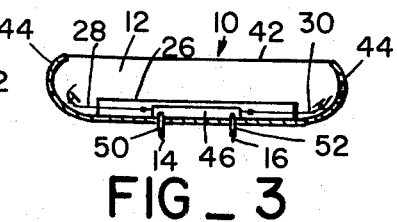
FIG_3
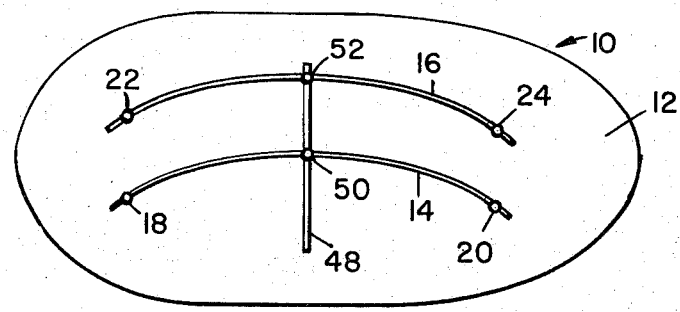
FIG_4
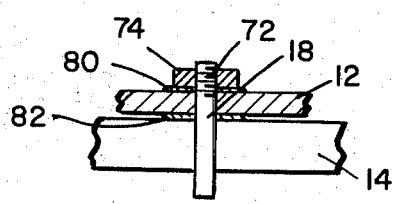
FIG_7
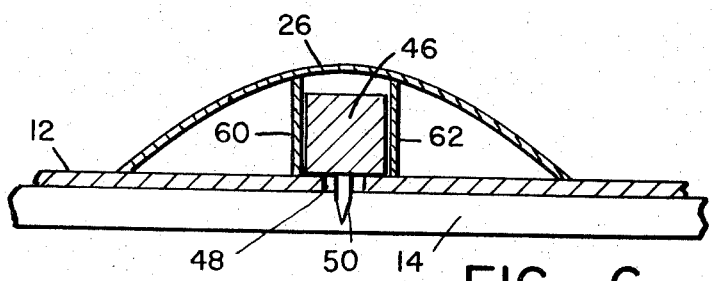
FIG_6
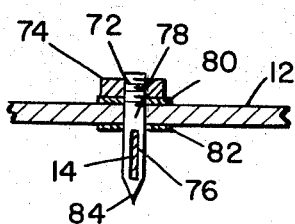
FIG_8
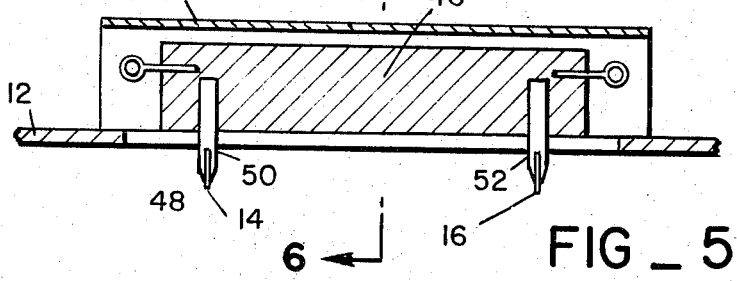
FIG_5

STEERABLE TOBOGGAN

BACKGROUND OF THE INVENTION

The present invention relates to toboggans, and particularly to steerable toboggans having a generally dish-shaped shell.

Two distinct types of toboggans are currently available. The traditional type of toboggan is designed for use by three or four persons, and is basically flat with an upwardly curved prow. The second and more recent type of toboggan, generally called a coaster, is a simple unitary dish, ordinarily designed for use by one person. The traditional type is usually a large, heavy and expensive apparatus requiring a large amount of skill and practice to operate properly, whereas the coaster is an extremely simple apparatus, and can be used by young children without difficulty. The traditional type has maneuverability, and the coaster type is easy to operate. However, no toboggans are presently available which combine the advantageous features of the two different types.

The use of vanes on the underside of the toboggan to provide an improved means of steering toboggans of the traditional type has often been tried. Examples of such devices are contained in U.S. Pat. No. 2,027,128, U.S. Pat. No. 2,766,992 and U.S. Pat. No. 3,498,627. However, each of the above examples utilized vanes having a fixed forward portion and a controllable aft portion. This type of apparatus requires that the toboggan itself have longitudinal stability, and have a flat aft portion so that the runners can be controlled at the aft portion of the toboggan. Since the coaster has little longitudinal stability, and has an upwardly curved aft portion, previous methods of using guide vanes to control the motion of the toboggan could not be adapted to a coaster.

SUMMARY OF THE INVENTION

The present invention provides a toboggan which can be positively controlled, but which still retains the basic simplicity of the coaster toboggan. A unitary shell having an upwardly curved periphery is adapted to slide over snow or a like surface. Parallel elongate guide vanes are located on the underside of the shell and are adapted to at least partially penetrate the surface. Each vane is pivotally attached to the shell adjacent both ends of the vane. Manually controlled means are provided for transversely deflecting the elongate guide vanes at the centers thereof to bend the guide vanes into an arc shape. When the guide vanes are so deflected, the shell turns as it slides over the surface.

Since the guide vanes of the present invention are controlled at their centers, rather than at the aft portion of the vane, the guide vanes can be easily used with a shell much like the coaster. The control apparatus can be in the center of the shell, and the shell can be generally circular. Since longitudinal stability is not a criteria, the toboggan need not be elongate. Hence, the present invention provides a toboggan which is basically a coaster, but which is capable of positive control.

Traditionally, coasters have no controllability other than what can be accomplished by the rider shifting his weight. In the preferred embodiment of the present invention, the guide vanes are controlled by two ropes, and one or the other rope is simply pulled to turn the shell. This provides a positive control over the movement of the shell, but is still simple to use, and can be easily mastered by a young child.

The shell of the present invention is preferably slightly elongate, having a circular forward portion but an ogive shaped aft portion. This shape has been found to provide greater maneuverability to the shell. Since the shell is generally stamped or molded in a single piece, the above shape can be formed almost as simply as the circular coaster, and does not add materially to the cost.

In the present invention, a cover is preferably placed over the upper portions of the steering mechanism. In this manner, sharp portions of the steering mechanism are not exposed, and the device is safe for young children to use. The steering mechanism comprises a simple slide bar which rides in a track and is controlled by ropes attached to either end of the bar. This apparatus is quite simple to operate, and is generally not subject to failure. Hence, there is little concern that the apparatus would fail, even when operated by one unfamiliar with the device.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a plan view of the steerable toboggan of the present invention;

FIG. 2 is a cross-sectional elevation view taken along lines 2—2 of FIG. 1;

FIG. 3 is a cross-sectional elevation view taken along lines 3—3 of FIG. 1;

FIG. 4 is a bottom view of the steerable toboggan illustrated in FIG. 1;

FIG. 5 is a fragmentary elevation view of the steering mechanism used in the steerable toboggan of the present invention;

FIG. 6 is a cross-sectional elevation view taken along lines 6—6 of FIG. 5;

FIG. 7 is a fragmentary side elevation view of the projection attaching the guide vane to the shell of the toboggan.

FIG. 8 is a fragmentary rear elevation view of the projection illustrated in FIG. 7.

DESCRIPTION OF THE PREFERRED EMBODIMENT

Referring initially to FIG. 1, a steerable toboggan 10 comprising a unitary shell 12 generally similar to a standard coaster is illustrated. The toboggan 10 has a pair of elongate guide vanes 14 and 16 on the underside thereof. Vane 14 is secured to shell 12 by pins 18 and 20 adjacent the fore and aft ends respectively of vane 14. Pins 18 and 20 extend through the bottom of shell 12 to engage vane 14 on the underside thereof. Vane 16 is similarly attached by pins 22 and 24 adjacent the fore and aft ends of vane 16. A transverse cover 26 extends over the steering mechanism, which will be further illustrated hereinafter. Ropes 28 and 30 provide for manual control of the steering mechanism, and also provide a hand hold for the rider, substituting for the loops found on the standard coaster. Alternate steering systems, such as a wheel or stick, could also be used, but the rope system illustrated is preferred because of its simplicity and ease of operation.

The preferred configuration of the shell 12 is illustrated by viewing FIGS. 1–3 in combination. FIG. 2 is taken along lines 2—2 of FIG. 1 and FIG. 3 is taken along lines 3—3 of FIG. 1. In this embodiment, the toboggan 10 is slightly elongate, having a generally circular forward portion 40 and an ogive shaped aft portion 42. This shape has been found to provide maximum controllability of the toboggan 10, facilitating turning of the toboggan with the guide vanes 14 and 16. In the embodiment of the toboggan illustrated in FIGS. 1–3, the entire periphery of shell 12 is upwardly curved. The forward portion 40 comprising the prow of the toboggan 10 is curved more than the aft portion 42 to insure that the shell 12 properly planes over the surface. The curvature of the periphery gradually decreases from the prow portion 40 to the aft portion 42 to provide intermediate curvature along sides 44 of the toboggan 10.

The manner in which ropes 28 and 30 are used to steer the toboggan 10 is illustrated by viewing FIGS. 1–4 in combination. Ropes 28 and 30 are connected to the opposite ends of a slide bar 46. Slide bar 46 is moveable from side to side beneath transverse cover 26 responsively to movement of ropes 28 and 30. Slide bar 46 moves along a transverse slot 48 formed in the bottom of shell 12. Lugs 50 and 52 extend from the bottom of slide bar 46 through slot 48 to engage guide vanes 14 and 16 adjacent the centers thereof. When either rope 28 or 30 is pulled, moving slide bar 46 along slot 48, lugs 50 and 52 deflect the centers of guide vanes 14 and 16 to bend the guide vanes into an arc shape as illustrated in FIG. 4. When the guide vanes 14 and 16 are in this position, the toboggan 10 turns as it slides over the surface.

Slide bar 46 is illustrated in detail by reference to FIGS. 5 and 6 in combination. Slide bar 46 moves from side to side along the transverse slot 48 in the bottom of shell 12. Transverse cover 26 passes over the slide bar, and vertical members 60 and 62 provide a track which confines slide bar 46 to transverse motion along slot 48. Lugs 50 and 52 are embedded in slide bar 46 and project downwardly from the underside of slide bar 46 through slot 48. Lugs 50 and 52 are fixedly attached to guide vanes 14 and 16. In this manner, transverse movement of slide bar 46 deflects the center of the guide vanes 14 and 16 as illustrated above. Also, lugs 50 and 52 fix the longitudinal position of guide vanes 14 and 16.

Referring next to FIGS. 7 and 8 in combination, the construction of the pin 18 is illustrated. (Pins 20, 22 and 24 are identical to pin 18). Pin 18 projects through the bottom of shell 12, and has a threaded upper portion 72 engaged by nut 74. The lower portion of pin 18 has a vertically extended rectangular sleeve 76 which is conformed to the shape of guide vane 14. Sleeve 76 maintains the flat guide vane 14 perpendicular to the bottom of shell 12, but allows for translational movement of guide vane 14 relative to pin 18. Thus, as the center of guide vane 14 is deflected, the guide vane is allowed to slide relative to pin 18. This allows the guide vane to be deformed into an arc without requiring extension of the vane itself. Pin 18 is rotatable about its longitudinal axis to facilitate deflection of the guide vane 14. Washers 80 and 82 on the upper and lower surfaces of shell 12 allow for pivotal movement of pin 18 without damage to shell 12. Pin 18 can have a pointed lower end 84 to minimize the obstruction caused by the pin 18 as the guide vane 14 passes through the snow.

In operation, one or more persons can sit in the toboggan. When one person is using the toboggan alone, he will normally sit in the aft portion with his feet extending into the forward portion, with cover 26 below his knees. This provides the rider with a comfortable riding position, and the rider can easily grasp ropes 28 and 30 to hold onto the toboggan. When the toboggan 10 is sliding across the snow or other surface, shell 12 will plane over the surface due to the upwardly curved forward portion 40. If the shell 12 turns sideways, it will still plane over the snow due to the upwardly curved sides 44 of the shell 12.

As the shell 12 slides over the snow, guide vanes 14 and 16 will penetrate the snow, giving the toboggan 10 an element of longitudinal stability. As long as the rider exerts equal pressure on both ropes 28 and 30, the toboggan 10 will maintain its forward momentum. However, when the rider pulls one or the other rope 28 or 30, guide vanes 14 and 16 will be deflected into an arc shape and the toboggan 10 will turn. In the embodiment illustrated, pulling the right-hand rope will turn the toboggan to the left, and vice versa. However, it would be an obvious modification to provide a pulley system whereby pulling the right-hand rope turns the toboggan to the right and vice versa. The slightly elongate shape of the preferred embodiment of the toboggan, wherein the forward portion 40 is generally circular and the aft portion 42 is ogive shaped, allows the toboggan 10 to be turned with only a small deflection of guide vanes 14 and 16, thus minimizing drag during turning.

The steerable toboggan of the present invention operates much like a basic coaster. The entire periphery of the toboggan is curved upwardly so that the shell 12 will plane over the snow even when operated improperly, and caused to go sideways or backwards. The rider can merely hold onto ropes 28 and 30, just as he would hold onto the loops on a coaster. Hence, the toboggan of the present invention can easily be used by a young child, or a person completely unfamiliar with the device. The steering mechanism is totally enclosed by cover 26 so as to present no danger to the rider. However, the rider has the option of positive control over the toboggan. This control can be easily mastered even by young children and will materially add to the enjoyment of the device.

While a preferred embodiment of the invention has been illustrated above, it is obvious that modifications and adaptations of that invention will occur to those skilled in the art. However, it is to be expressly understood that such modifications and adaptations are within the spirit and scope of the present invention, as set forth in the following claims.

What is claimed is:

1. A steerable toboggan comprising:
a generally flat-bottomed shell adapted to slide over a surface;
elongate guide vanes on the underside of the shell;

means for pivotally attaching each said guide vane to said shell adjacent both ends of each respective vane, said attaching means including means for allowing translation of said guide vanes with respect to said attachment means to allow for relatively large transverse deflection of the guide vanes;

manually controlled means for transversely deflecting the elongate guide vanes at the centers thereof to bend said guide vanes into an arc to turn the shell as it slides over the surface, said manually controlled means including means for restricting translation of the guide vanes with respect to the manually controlled means.

2. A steerable toboggan as recited in claim 1 wherein the periphery of the shell is upwardly curved.

3. A steerable toboggan as recited in claim 1 wherein the flat-bottomed shell has a transverse slot adjacent the center of the vanes, and wherein the manually controlled means for transversely deflecting the elongate vanes comprises a track corresponding to the slot, a slide bar manually translatable along the track, and lugs extending from the underside of the bar through the slot and connected to the elongate vanes.

4. A steerable toboggan as recited in claim 3 and additionally comprising a cover extending over the track and attached to the shell, and ropes attached to each end of the slide bar and extending outside the cover at the ends of the track, said ropes adapted to be manually operated to control the movement of the slide bar.

5. A steerable toboggan as recited in claim 4 and additionally comprising a pulley adjacent each end of the track, and wherein the ropes pass over said pulleys to facilitate manual operation of the slide bar.

6. A steerable toboggan as recited in claim 1 wherein the means for pivotally attaching the ends of each said vane to the shell comprises a projection extending downwardly from the shell and rotatable about the vertical axis of said projection, said projection having a sleeve adapted to surround the vane to support said vane but allow translational movement of said vane relative to said projection.

7. A steerable toboggan as recited in claim 1 wherein the shell is slightly elongate and has a generally circular forward portion and a generally ogive rearward portion.

8. A steerable toboggan as recited in claim 1 wherein the vanes are flat, and are mounted perpendicularly to the bottom of the shell.

9. A steerable toboggan as recited in claim 1 wherein the vanes are generally parallel when undeflected.

10. In a toboggan comprising a generally flat-bottomed shell for sliding over a surface such as snow, said shell having an upwardly curved periphery at least at the forward portion so that the shell planes over the surface, the improvement comprising:

fore and aft projections extending downwardly from the underside of the shell and rotatable about the vertical axis of the projection, each said projection having a vertically extended rectangular sleeve therethrough;

an elongate, generally flat guide vane slideably extending through the sleeves in the fore and aft projections and maintained perpendicular to the shell by the rectangular sleeves; and control means fixedly attached to the guide vane at the center of said guide vane to prevent longitudinal movement of said vane, said control means manually translatable from side to side to bend the guide vane into an arc to turn the toboggan.

11. In the toboggan of claim 10, the improvement wherein the shell has a transverse slot adjacent the center of the guide vane, and wherein the control means comprises a slide bar manually translatable along the length of the slot, and lugs extending from the slide bar and through the slot to fixedly engage the guide vane at the center thereof.

* * * * *